May 2, 1961 — T. F. FITZGIBBON — 2,982,306
PILOT-OPERATED VALVE ASSEMBLY
Filed June 21, 1956 — 2 Sheets-Sheet 1

INVENTOR.
THOMAS F. FITZGIBBON
BY Oberlin + Limbach
ATTORNEYS.

May 2, 1961 T. F. FITZGIBBON 2,982,306
PILOT-OPERATED VALVE ASSEMBLY
Filed June 21, 1956 2 Sheets-Sheet 2

INVENTOR.
THOMAS F. FITZGIBBON
BY
Oberlin & Limbach
ATTORNEYS.

United States Patent Office 2,982,306
Patented May 2, 1961

2,982,306

PILOT-OPERATED VALVE ASSEMBLY

Thomas F. Fitzgibbon, Los Angeles, Calif., assignor to Parker-Hannifin Corporation, Cleveland, Ohio, a corporation of Ohio Filed June 21, 1956, Ser. No. 592,903

6 Claims. (Cl. 137—623)

The present invention relates generally as indicated to a pilot operated valve assembly and more particularly to a valve assembly in which the movements of a main valve member therein are under the control of a solenoid operated pilot valve.

A principal objective of the present invention is to provide a valve assembly of the character indicated which has been devised especially for use in fluid systems subjected to a wide range of ambient and/or fluid temperatures, for example, minus 65 to plus 600° F.

Another object of this invention is to provide a valve assembly having a unique form of casing utilizing a relatively few number of different components, from which a large variety of styles of casings may be made up viz., two-way, three-way, four-way, etc., with the radially extending ports thereof, rotatively positioned to best suit the installation at hand.

Another object of this invention is to provide a valve assembly of the character indicated wherein the pilot valve and its actuator is a self-contained unit which is detachably connected to the main valve casing in any desired rotary position.

It is still another object of this invention to provide a valve assembly in which mounting means, such as a pair of rings formed with radially extending legs may be rotatively positioned with respect to the valve casing before being immovably secured on the latter.

Another object of this invention is to provide a light weight valve assembly structure of which relatively sliding parts are made of the same metal or alloy to eliminate binding of or excessive clearance due to different coefficients of thermal expansion of said close fitting relatively moving parts thereof, when said valve assembly is subjected to widely varying temperatures as previously indicated.

It is also another object of this invention to provide a novel technique in assembling a casing for a multiport valve.

Other objects and advantages of the present invention will become apparent as the following description proceeds.

To the accomplishment of the foregoing and related ends, the invention, then, comprises the features hereinafter fully described and particularly pointed out in the claims, the following description and annexed drawings setting forth in detail certain illustrative embodiments of the invention, these being indicative, however, of but a few of the various ways in which the principle of the invention may be employed.

Figure 1:
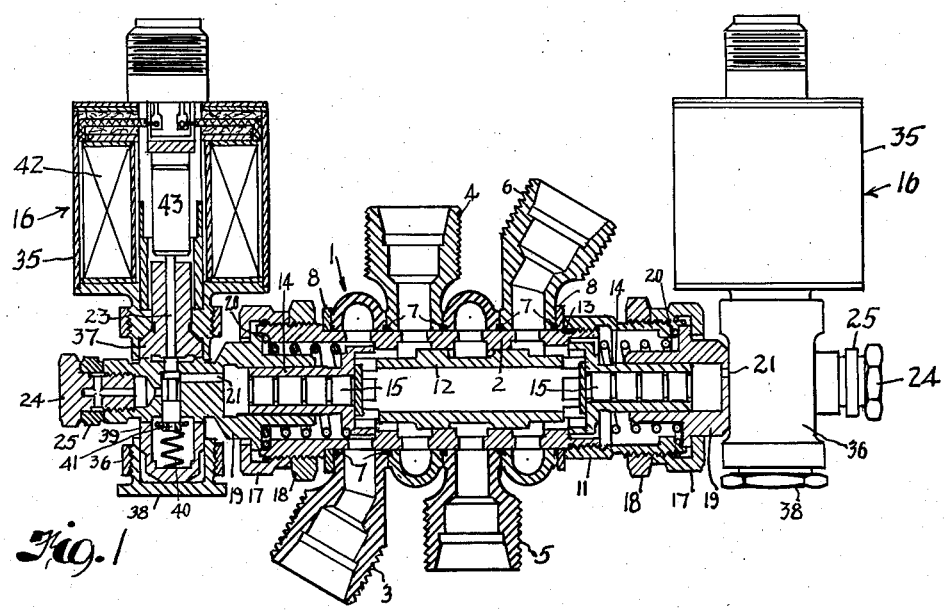
Fig. 1 is a longitudinal cross-section view of one form of the present invention, the same being a three-position, four-way valve which employs solenoid operated pilot valves mounted at opposite ends of the valve casing.

Referring now in detail to the annexed drawings, and first to the form of the valve assembly illustrated in Figs. 1–6, the same comprises a main valve body or casing 1 having a ported tubular sleeve 2 on which a plurality of ring-like port adapters 3, 4, 5, and 6 are secured in fluid tight relation as by means of heat fused rings 7 (brazing wire, silver solder, etc.) disposed in annular recesses defined between successive abutting adapters. Also mounted on said sleeve 2 adjacent the first and last of said port adapters are rings 8; 8 each of which is formed with radially extending legs 9 terminating in apertured feet 10 by which the valve casing 1 is adapted to be mounted on a suitable support.

Figure 2:
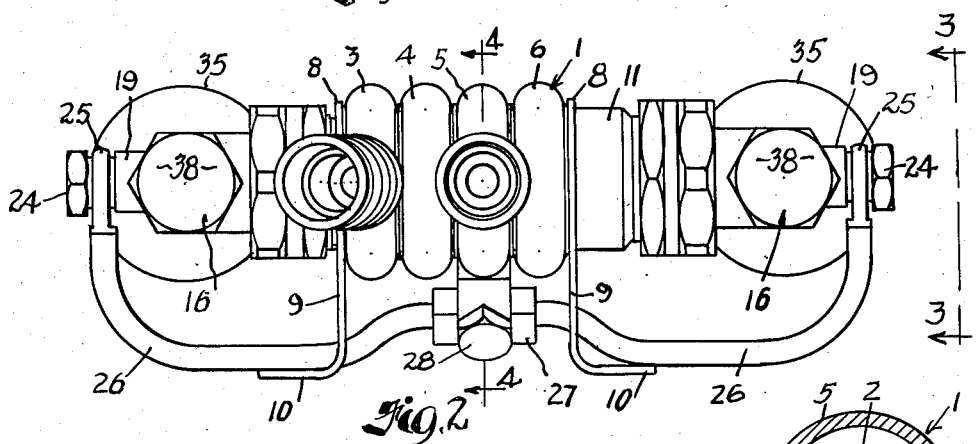
Fig. 2 is an elevation view as viewed upwardly from the bottom of Fig. 1.
Figure 3:
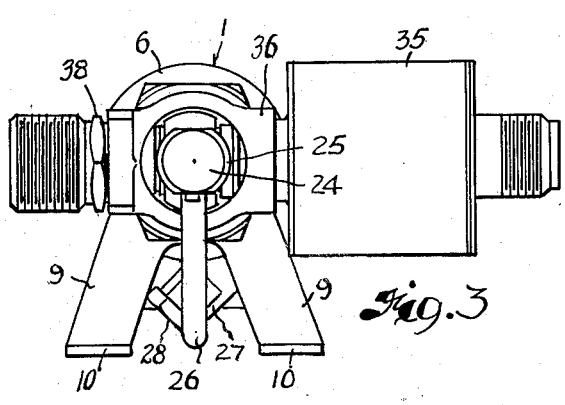
Fig. 3 is an end elevation view as viewed from the right hand end of Fig. 2, as indicated by the line 3—3, Fig. 2.

The ring 8 at the left as viewed in Figs. 1 and 2 bears against a shoulder of the sleeve 2 and the other ring 8 is engaged by a nut or thimble 11 which is threaded onto the other end of said sleeve 2. Thus, when the valve casing 1 is made up, the left ring 8 is first slipped on the tubular sleeve 2, then follows the required number of port adapters 3 to 6, four in this case, with intervening brazing rings 7 and finally the other ring 8 is slipped on said sleeve 2. Said rings 8; 8 and port adapters 3 to 6 each preferably have a sliding fit on said sleeve 2, and as evident, said rings and said port adapters may be rotatively positioned, as desired, on said sleeve 2 and held in such rotary adjusted positions by pressure applied through the thimble 11 aforesaid which clamps all of these parts together on said sleeve. With the valve casing 1 thus assembled the same is heated, as in a brazing furnace or the like, whereupon the heat-fusible rings 7 are fused to bond said rings 8; 8 and said port adapters 3 to 6 in fixed position and in fluid-tight relation around said sleeve 2.

Preferably said sleeve 2 and said port adapters 3–6, as well as the rings 8; 8, are made of metal such as steel, for example, which has a melting point exceeding that of the brazing wire 7 or other metal or alloy which is used for bonding the port adapters 3–6 and mounting rings 8; 8 on said sleeve 2. With the port adapters 3–6 and said rings 8; 8 thus brazed or otherwise bonded on the sleeve 2, the valve body or casing 1 thus produced may be plated or otherwise treated to impart corrosion resistance and a brazing ring 13 or the like is provided to seal the joint between thimble 11 and sleeve 2.

Reciprocably mounted in the sleeve 2 of said valve casing 1 is a spool valve member 12 which by way of illustrative example is herein shown as a three position peripherally grooved spool valve member which is operative in its intermediate position or neutral position, as shown in Fig. 1 to close off fluid communication between the pressure port adapter 5 and both of the cylinder port adapters 4 and 6, and to open communication of both of said cylinder port adapters 4 and 6 with the return port adapter 3 by way of passages in the sleeve and spool valve member. The spool valve member 12 is held in its aforesaid neutral position by spring loaded followers 14 which constitute cylinders for pistons 15. In said neutral position of said spool valve member 12, fluid pressure in the pressure port adapter 5 acts on both pistons 15 and followers 14, in a manner to be described hereinafter.

It can be seen from Fig. 1 that when the spool valve member 12 is shifted toward the left, the pressure port adapter 5 is brought into communication with the cylinder port adapter 4 while the other cylinder port adapter 6 is brought to greater communication with the return port adapter 3. Similarly, when the spool valve member 12 is shifted to the right from the Fig. 1 position, the pressure port adapter 5 is communicated with said other cylinder port adapter 6 and said one cylinder port adapter 4 is brought to greater communication with the return port adapter 3. In other words, the spool valve assembly herein illustrated is a four-way valve.

In the present case, the spool valve member 12 is moved from the neutral position by admitting fluid under pressure into one cylinder 14 to act on the piston 15 therein, while communicating the other cylinder 14 with the return port adapter 3, and the control of such admission of fluid under pressure to act on the one or the other of said pistons 15, is effected as by means of solenoid operated pilot valve assemblies 16 which are detachably connected at the opposite ends of the main valve casing 1. As shown, the thimble 11 is externally threaded at its outer end, as is the other end of the tubular sleeve 2, for threading thereonto a nut 17 and lock nut 18. The inturned flange of each nut 17 bears on the collar of a pilot valve body 19, there being interposed between said pilot valve body 19 and said sleeve 2, or said thimble 11, a metallic packing ring 20, for example, a hollow metal O-ring as of copper or the like, or even an O-ring of rubber-like material having a continuous metal sheath therearound to protect the rubber or rubber-like core from deterioration from high ambient and/or fluid temperatures.

Inasmuch as both solenoid operated pilot valve assemblies 16 are identical, only one has been shown in cross-section in Fig. 1 and only said one will be described now in detail.

The pilot valve body 19 at its inner end provides a guide bore for the cylinder or follower 14 and leading into said guide bore is a passage 21 which is alternately communicated with the pressure port adapter 5 and the return port adapter 3 by means of the pilot valve member 23 which is reciprocably mounted in a cross bore formed in said pilot valve body 19. Threaded into the outer end of said pilot valve body 19 is the bolt 24 of a so-called "universal type" of "banjo-type" fitting 25, said bolt 24 serving to clamp said fitting 25 between the outer end of said pilot valve body 19 and the head of said bolt 24.

Figure 4:
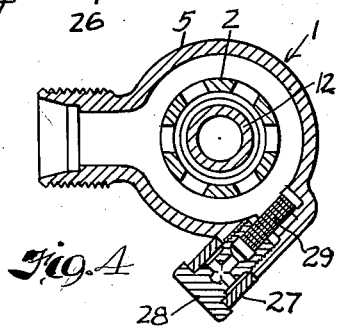
Fig. 4 is a transverse cross-section view taken substantially along the line 4—4, Fig. 2.

Each said "banjo-type" fitting 25 (see Fig. 2) is provided with a radially extending port to which one end of a length of metal tube 26 is brazed or otherwise secured. In turn, the other ends of said tubes 26 are brazed or otherwise secured to the respective ports of the "banjo-type" fitting 27 which is clamped to the pressure port adapter 5 by means of the bolt 28 as best shown in Figs. 2 and 4. Preferably, there is provided a screen or filter 29 so that the fluid passing through the pilot valve assemblies 16 from the pressure port adapter 5 will be clean and thereby will not impair the proper functioning of the pilot valve members 23, the followers 14, and the pistons 15.

Figure 6:
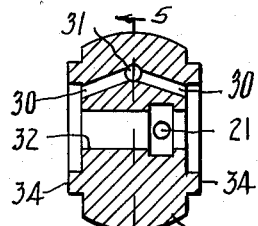
Fig. 6 is a transverse cross-section view of the pilot valve body as taken substantially along the line 6—6, Fig. 5.
Figure 5:
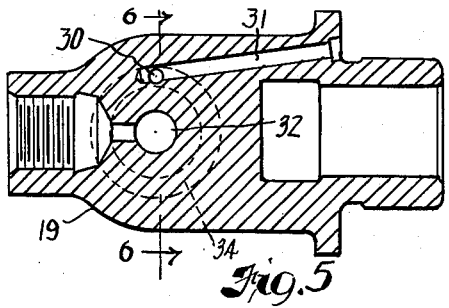
Fig. 5 is a longitudinal cross-section view of one of the pilot valve bodies taken along a plane at right angles to the section of Fig. 1.

By referring to Figs. 5 and 6, it can be seen that the passage 21 of the pilot valve body 19 is communicated with the return port adapter 3 by way of the drilled passages 30 and 31 which lead from the opposite ends of the cross-bore 32 (in which pilot valve member 23 is reciprocable) into said sleeve 2.

The pilot valve member 23 is provided with a pair of axially spaced lands so arranged that when said pilot valve member 23 is in the position shown in Fig. 1, fluid under pressure in tube 26 and fitting 25 flows through passage 21 to urge the cylinder or follower 14 and piston 15 toward the right as viewed in Fig. 1, and thereby to shift the spool valve member 12 to the right. On the other hand when said pilot valve member 23 is moved downwardly pressure on said follower 14 and piston 15 is relieved by reason of communication of passage 21 with return port adapter 3 by way of passages 30 and 31.

It is to be noted further that the pilot valve body 19 intermediate its ends, is formed with opposite, parallel, annular bosses 34 (see Figs. 5 and 6) to which the solenoid casing 35 is mounted by means now to be described.

Fitted over said intermediate section of said pilot valve body 19 is an internally threaded thimble 36 into which the solenoid casing 35 is screwed so as to clamp the pilot valve guide bushing 37 against one boss 34 of said pilot valve body 19. Threaded into the other end of said thimble 36 is a screw 38 which presses the plug 39 against the other boss 34 of the said pilot valve body 19. A spring 40 is compressed between said plug 39 and a follower 41 which engages the bottom end of said pilot valve member 23 to normally hold the latter in the position shown when the solenoid 42 is de-energized. The solenoid armature 43 is connected to the upper end of said pilot valve member 23 and when said solenoid 42 is energized, said armature 43 is moved downwardly to correspondingly shift the pilot valve member 23 so as to communicate the passage 21 with the return port adapter 3 by way of the passages 30 and 31 as previously described. The solenoid 42 is hermetically sealed within casing 35 and preferably sealing materials are used which are unaffected by high temperatures which may be encountered.

Having thus described one embodiment of the present invention, reference will now be made to the operation thereof. As before explained the spool valve member 12 is shown in Fig. 1 in its neutral position which it assumes when both of the solenoids 42 are de-energized. If it is desired to establish fluid communication between the pressure port adapter 5 and the cylinder port adapter 4 by shifting the spool valve member 12 toward the left, the left solenoid 42 is energized, whereupon left piston 15 and the follower 14 are free to move to the left under the influence of pressure acting on the right piston 15. This causes the spool member 12 to be shifted to the left, until the left follower 14 abuts the end of the pilot valve body 19. Conversely, when it is desired to communicate the fluid pressure port adapter 5 with the other cylinder port adapter 6 by shifting the spool valve member 12 toward the right, the right solenoid 42 is energized to communicate the right piston 15 and follower 14 with the return port adapter 3, whereupon, pressure acting on the left piston 15 forces the spool valve member 12 to the right until the right follower 14 abuts the end of the right pilot valve body 19.

It is to be noted that both of the solenoid-operated pilot valve assemblies 16 may be rotatively positioned in any desired direction with respect to the valve casing 1 simply by loosening the nuts 17 and turning said assemblies 16. In fact, a certain amount of rotation of each assembly 16 may be effected even after the "banjo" fittings 25 have the tubes 26 secured thereto, by loosening bolts 24.

The spool valve member 12 and the sleeve 2 of the valve casing 1 are closely fitted and preferably lapped in known manner, to achieve sliding fit with fluid tight sealing within limits permitted by this type of valve construction. The spool valve member 12 and the valve casing 1 are preferably made of the same metal, such as steel, for example, and for this reason, even though said valve assembly may be subjected to widely varying temperatures (either ambient or fluid temperature), the coefficients of thermal expansion of said parts are the same whereby no objectionable binding or excessive clearance gaps are formed at the low and high temperature extremes. As previously mentioned, the valve assembly herein may be subjected to ambient and/or fluid temperatures which range from minus 65° to plus 600° F. or more.

Figure 7:
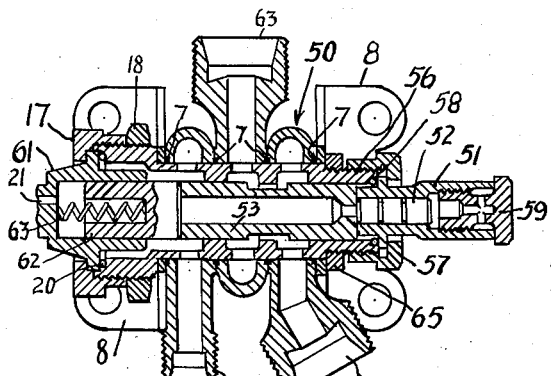
Fig. 7 is a longitudinal cross-section view of another embodiment of this invention, specifically a three-way valve.
Figure 8:
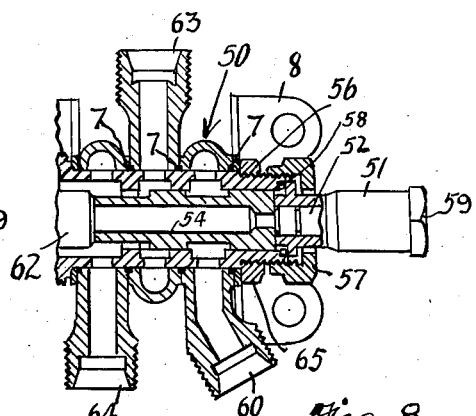
Fig. 8 is a fragmentary cross-section view of still another embodiment of this invention, specifically a threeway valve which is of somewhat different construction from hte three-way valve shown in Fig. 7.

In Figs. 7 and 8 there are illustrated two forms of three-way spool-type valves and because the spool valve members in each have only two operating positions, only a single solenoid operated pilot valve assembly 16 (not shown) at one end of the valve casing 50 is required. To the extent that the Figs. 7 and 8 valves employ the same parts as the Figs. 1 to 6 valve, the same reference numerals have been used to eliminate repeating of the description thereof.

In Figs. 7 and 8 the inner end of the fitting 51 is provided with a bore to constitute a cylinder for the piston 52 which is reciprocable therein and which is engageable with one end of the spool valve member 53 (in Fig. 7) or spool valve member 54 (in Fig. 8) reciprocably mounted in the tubular ported sleeve 56. The fitting 51 is secured in place by nut 57 which clamps the collar thereof against the metallic packing ring 58 disposed in the end of said sleeve 56. The outer end of fitting 51 is closed by bolt 59 and is connected by a tube (not shown) to the pressure port adapter 60 in substantially the same way as fitting 25 is connected by tube 26 to pressure port adapter 5 in Figs. 2 and 4.

In this case, the inner end of the pilot valve body 61 constitutes a cylinder for the large diameter piston 62 which engages the other end of the spool valve member 53 or 54 and which is pressed by means of the spring 63 toward the right.

When the solenoid (not shown) at the left hand end of Fig. 7 is de-energized, fluid from the pressure port adapter 60 acts on the projected area of the large piston 62 thereadjacent, and although such pressure is constantly acting on the outer end of the smaller piston 52, the differential area effects a moving of the spool valve member 53 to its extreme right hand position as shown in Fig. 7. When the spool valve member 53 is in that position, that is moved to the right as shown in Fig. 7, fluid flows from the pressure port adapter 60 to the cylinder port adapter 63 which is adapted for connection to the port of a single acting cylinder. When said solenoid is energized, the passage 21 is communicated with the return port adapter 64 in the manner already described and, therefore, the fluid pressure acting on the smaller piston 52 moves the spool valve member 53 toward the left, correspondingly moving the larger piston 62 and compressing the spring 63. In that position of the spool valve member 53, that is, its left position, the cylinder port adapter 63 is communicated with the return port adapter 64 whereby the piston in the single acting cylinder may descend by gravity or otherwise with fluid being displaced thereby through the cylinder port adapter 63 to the return port adapter 64 by way of the spool valve passages.

The spool valve member 53 in Fig. 7 therefore has only two positions and only requires the one solenoid operated pilot valve assembly 16 having the slightly modified body 61.

The structure shown in Fig. 8 is substantially identical with that shown in Fig. 7. However, in Fig. 8 the spool valve member 54 is fashioned so that when the solenoid (not shown) at the left hand end of the assembly is de-energized, the pressure port adapter 60 is blocked from communicating with the cylinder port adapter 63 while the latter is in communication with the return port adapter 64. Now, when said solenoid is energized, the spool valve member 54 is shifted to the left, as in Fig. 7, to establish fluid communication between the pressure port adapter 60 and the cylinder port adapter 63.

As evident, the actions of the Figs. 7 and 8 constructions are opposite with reference to what happens when the solenoid thereof is energized. The particular installation would dictate the selection of Fig. 7 or Fig. 8 so that the solenoid thereof would not have to remain energized over extended periods of time during normal use.

In Figs. 7 and 8 the port adapters 60, 63, and 64 and the mounting rings 8; 8 are clamped in place for brazing by nut 65, which is equivalent to thimble 11 in Figs. 1 and 2.

Figure 9:
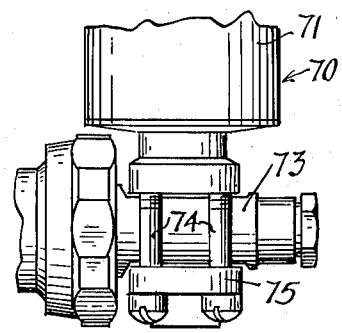
Fig. 9 is a side elevation view showing a modified form of solenoid mounting on a pilot valve body.
Figure 10:
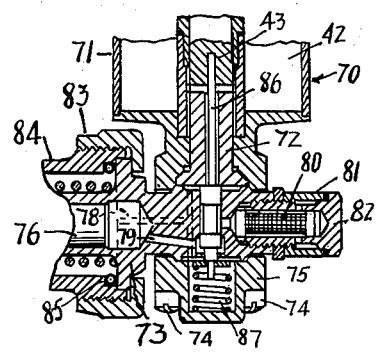
Fig. 10 is a cross-section view of the pilot valve and solenoid assembly shown in Fig. 9.

Figs. 9 and 10 illustrate an alternative form of pilot valve and solenoid assembly 70 in which the two-part solenoid casing 71 and pilot valve guide bushing 72 are clamped to the annular bosses of pilot valve body 73 by means of bolts 74 which extend from one part 75 of said solenoid casing to the other part 71 to thus effect fluid tight seals with said annular bosses.

In Fig. 10, the pilot valve body 73 is again formed as a cylinder for the spool valve member actuating piston 76 and the dotted lines 78 designate the passages for communicating the passage 79 with the return port adapter (not shown) in the manner already described, said passages 78 corresponding to the passages 30 and 31 described in relation to Figs. 5 and 6.

Another difference in Figs. 9 and 10 construction is that the filter or screen 80 for the actuating fluid is a part of the pilot valve body 73, rather than being mounted in the pressure port adapter 5 as shown in Fig. 4. However, the pilot valve body 73 yet has secured thereto a "banjo-type" fitting 81 by bolt 82 for connection of a length of tube (not shown) thereto which leads from a port of the pressure port adapter (not shown) or from some other convenient place in the high pressure line which is connected to said pressure port adapter. In Fig. 10, the pilot valve body 73 is clamped in place by nut 83 on thimble 84 and again a hollow metal O-ring 85 or the like establishes a fluid-tight joint. In this case, the thimble 84 is threaded on the ported tubular sleeve of the valve casing and serves to clamp the mounting rings 8; 8 and port adapters (like 3 to 6 or 60, 63 and 64) in place on the sleeve while the heat-fusible rings are melted. In this case it is preferred to also employ a heat fusible ring between the end of thimble 84 and the mounting ring 8 thereadjacent so that said thimble becomes a permanent part of the main valve casing.

The pilot valve member 86 has its upper end connected to solenoid armature 43 and is pressed upward by spring 87 to communicate passage 79 to the return port adapter by way of passages 78 when solenoid 42 is de-energized. When solenoid 42 is energized, pilot valve member 86 is moved down so that fluid flows through screen 80 and passage 79 to actuate piston 76 toward the left.

An important feature of the present invention is its compact, lightweight construction made possible by the use of abutting port adaptors of axial lengths less than the diameters of the respective radially extending and circumferentially offset ports. Thus, in Fig. 1, for example, the axial length of the sleeve 2 between the rings 8 is substantially less than the aggregate length required if the ports 3, 4, 5 and 6 were in a line and spaced apart to provide the usual nut and wrench clearances.

Other modes of applying the principle of the invention may be employed, change being made as regards the details described, provided the features stated in any of the following claims, or the equivalent of such, be employed.

I therefore particularly point out and distinctly claim as my invention:

1. A compact, lightweight valve assembly comprising a tubular sleeve formed with a series of axially offset ports through the wall thereof; a valve member axially movable in said sleeve to control flow of fluid through said ports; said sleeve being threaded at one end; a series of axially adjacent ring-like port adaptors encircling said sleeve and having radially extending legs providing radially extending passages communicating with the respective ports in all rotary positions of said port adaptors on said sleeve and radially outer ends for connection of tubing thereto, said radially outer ends of the legs of said port adaptors being of diameter greater than the axial lengths of the respective port adaptors and successive ones being positioned in circumferentially offset relation so as to clear one another for connection of tubing thereto; said abutting port adaptors and said sleeve defining annular chambers therebetween; and heat-fused rings in said chambers for bonding together said port adaptors and sleeve in fixed relative positions and in fluid tight relation; valve actuating means including a radially extending portion and an axially extending portion adapted to be secured to the threaded end of said sleeve in any rotary position to position said radially extending portion as desired; and nut means engaged with the threads of said sleeve to releasably clamp the axially extending portion of said valve actuating means to said sleeve with said radially extending portion disposed in any selected rotary position.

2. A compact, lightweight valve assembly comprising a valve body formed with a bore, and with a plurality of axially spaced apart ports intersecting said bore; and a spool valve member movable axially in said bore to control flow of fluid through said ports; said body comprising a tubular sleeve integrally formed with external threads at its opposite ends and an intervening cylindrical portion through which said ports extend, said cylindrical portion being of diameter at least as great as the major diameter of the threads at one end and less than the major diameter of the threads at the other end to form a shoulder thereat, a series of ring-like port adaptors having a slip fit over said cylindrical portion, a nut threaded on the threads at such one end of said sleeve to form another shoulder by which said port adaptors are held on said sleeve in axially abutting relation between such shoulders for brazing on such cylindrical portion of said sleeve, said port adaptors having radially extending legs providing radially extending passages communicating with the respective ports of said sleeve in all rotary positions of said port adaptors and radially outer ends for connection of tubing thereto, said radially outer ends of the legs of said port adaptors being of diameter greater than the axial lengths of the respective port adaptors and successive ones being positioned in circumferentially offset relation so as to clear one another for connection of tubing thereto; a cylinder extending axially into one end of said sleeve; another nut in threaded engagement with the threads at an end of said sleeve being operative to clamp said cylinder in said sleeve; a piston movable in said cylinder to engage said spool valve to move the latter in said bore; a pilot valve and a radially extending solenoid secured to said cylinder in such manner that, when said solenoid is energized, said pilot valve is effective to admit fluid under pressure into said cylinder to move said piston therein; said solenoid, pilot valve, and cylinder being rotatable as a unit about the axis of said sleeve whereby said solenoid may be swung to any desired radial position at which it is releasably locked by said another nut.

3. A compact, lightweight valve assembly comprising a valve body formed with a bore, and with a plurality of axially spaced apart ports intersecting said bore; and a valve member movable in said bore to control flow of fluid through said ports; said body comprising a tubular sleeve integrally formed with external threads at its opposite ends and an intervening cylindrical portion through which said ports extend, said cylindrical portion being of diameter at least as great as the major diameter of the threads at one end and less than the major diameter of the threads at the other end to form a shoulder thereat, a series of ring-like port adaptors having a slip fit over said cylindrical portion, a nut threaded on the threads at such one end of said sleeve to form another shoulder by which said port adaptors are held on said sleeve in axially abutting relation between such shoulders for brazing on such cylindrical portion of said sleeve, said port adaptors having radially extending legs providing radially extending passages communicating with the respective ports of said sleeve in all rotary positions of said port adaptors and radially outer ends for connection of tubing thereto, said radially outer ends of the legs of said port adaptors being of diameter greater than the axial lengths of the respective port adaptors and successive ones being positioned in circumferentially offset relation so as to clear one another for connection of tubing thereto; a valve member actuating solenoid having a radially extending portion and an axially extending portion provided with a collar, said axially extending portion rotatably adjustably fitting within an end of said sleeve, and another nut in threaded engagement with the adjacent threads of said sleeve having a shoulder which is operative to engage said collar to clamp said axially extending portion to said sleeve with said radially extending portion disposed in any selected radial position.

4. A compact, lightweight valve assembly comprising a valve body formed with a bore, and with a plurality of axially spaced apart ports intersecting said bore; and a spool valve member movable axially in said bore to control flow of fluid through said ports; said body comprising a tubular sleeve integrally formed with external threads at its opposite ends and an intervening cylindrical portion through which said ports extend, said cylindrical portion being of diameter at least as great as the major diameter of the threads at one end and less than the major diameter of the threads at the other end to form a shoulder thereat, a series of ring-like port adaptors having a slip fit over said cylindrical portion, a nut threaded on the threads at such one end of said sleeve to form another shoulder by which said port adaptors are held on said sleeve in axially abutting relation between such shoulders for brazing on such cylindrical portion of said sleeve, said port adaptors having radially extending legs providing radially extending passages communicating with the respective ports of said sleeve in all rotary positions of said port adaptors and radially outer ends for connection of tubing thereto; a cylinder extending axially into one end of said sleeve; another nut in threaded engagement with the threads at an end of said sleeve being operative to clamp said cylinder in said sleeve; a piston movable in said cylinder to engage said spool valve to move the latter in said bore; a pilot valve and a radially extending solenoid secured to said cylinder in such manner that, when said solenoid is energized, said pilot valve is effective to admit fluid under pressure into said cylinder to move said piston therein; said solenoid, pilot valve, and cylinder being rotatable as a unit about the axis of said sleeve whereby said solenoid may be swung to any desired radial position at which it is releasably locked by said another nut.

5. A compact, lightweight valve assembly comprising a valve body formed with a bore, and with a plurality of axially spaced apart ports intersecting said bore; and a valve member movable in said bore to control flow of fluid through said ports; said body comprising a tubular sleeve integrally formed with external threads at its opposite ends and an intervening cylindrical portion through which said ports extend, said cylindrical portion being of diameter at least as great as the major diameter of the threads at one end and less than the major diameter of the threads at the other end to form a shoulder thereat, a series of ring-like port adaptors having a slip fit over said cylindrical portion, a nut threaded on the threads at such one end of said sleeve to form another shoulder by which said port adaptors are held on said sleeve in axially abutting relation between such shoulders for brazing on such cylindrical portion of said sleeve, said port adaptors having radially extending legs providing radially extending passages communicating with the respective ports of said sleeve in all rotary positions of said port adaptors and radially outer ends for connection of tubing thereto; a valve member actuating solenoid having a radially extending portion and an axially extending portion provided with a collar, said axially extending portion rotatably adjustably fitting within an end of said sleeve, and another nut in threaded engagement with the adjacent threads of said sleeve having a shoulder which is operative to engage said collar to clamp said axially extending portion to said sleeve with said radially extending portion disposed in any selected radial position.

6. A compact, lightweight valve assembly comprising a tubular sleeve formed with a series of axially offset ports through the wall thereof; a valve member axially movable in said sleeve to control flow of fluid through said ports; said sleeve being threaded at one end; a series of axially adjacent ring-like port adaptors encircling said sleeve and having radially extending legs providing radially extending passages communicating with the respective ports in all rotary positions of said port adaptors on said sleeve and radially outer ends for connection of tubing thereto; said abutting port adaptors and said sleeve defining annular chambers therebetween; and heat-fused rings in said chambers for bonding together said port adaptors and sleeve in fixed relative positions and in fluid tight relation; valve actuating means including a radially extending portion and an axially extending portion adapted to be secured to the threaded end of said sleeve in any rotary position to position said radially extending portion as desired; and nut means engaged with the threads of said sleeve to releasably clamp the axially extending portion of sid valve actuating means to said sleeve with said radially extending portion disposed in any selected rotary position.

References Cited in the file of this patent

UNITED STATES PATENTS

| | | |
|---|---|---|
| 423,105 | Allen | Mar. 11, 1890 |
| 1,595,755 | Brooks | Aug. 10, 1926 |
| 2,251,618 | Rogers et al. | Aug. 5, 1941 |
| 2,262,823 | Stearns | Nov. 18, 1941 |
| 2,367,241 | Stacy | Jan. 16, 1945 |
| 2,367,682 | Kehle | Jan. 23, 1945 |
| 2,409,517 | Schmit | Oct. 15, 1946 |
| 2,418,448 | Arbogast | Apr. 8, 1947 |
| 2,506,711 | Evans | May 9, 1950 |
| 2,725,077 | Nicholl | Nov. 29, 1955 |
| 2,747,611 | Hewitt | May 29, 1956 |
| 2,752,119 | Allen | June 26, 1956 |
| 2,754,840 | Hicks | July 17, 1956 |
| 2,826,178 | Krapf | Mar. 11, 1958 |

FOREIGN PATENTS

| | | |
|---|---|---|
| 338,244 | France | May 11, 1904 |